United States Patent [19]

Zallie et al.

[11] Patent Number: 4,615,888
[45] Date of Patent: Oct. 7, 1986

[54] BREAD CONTAINING WXSU$_2$ GENOTYPE STARCH AS AN ANTI-STALENT

[75] Inventors: James Zallie, Bound Brook, N.J.; Robert Trimble, Suffolk, Va.; Harvey Bell, Martinsville, N.J.

[73] Assignee: National Starch and Chemical Corporation, Bridgewater, N.J.

[21] Appl. No.: 587,440

[22] Filed: Mar. 8, 1984

[51] Int. Cl.$^4$ .......................... A21D 2/00; A21D 8/02; A21D 10/00; A21D 13/00
[52] U.S. Cl. ..................................... 426/21; 426/549; 426/551; 426/552; 426/556; 426/558; 426/653; 426/661
[58] Field of Search ........................ 426/18, 19, 21, 27, 426/549, 551, 556, 558, 661, 653

[56] References Cited

U.S. PATENT DOCUMENTS 3,193,389  7/1965  Dehne et al. .......................... 426/18
4,428,972  1/1984  Wurzburg et al. .................. 426/578

Primary Examiner—Esther M. Kepplinger
Assistant Examiner—Louanne C. Krawczewicz
Attorney, Agent, or Firm—Lori D. Tolly; Edwin M. Szala

[57] ABSTRACT

Chemically and yeast leavened bakery products which have improved shelf lives are provided by the inclusion of an effective amount of a starch or flour selected from a plant of a wxsu$_2$ genotype in the bakery product dough. Breads which contain the starch or flour, preferably obtained from maize, are provided with a softer, moister crumb after baking as well as a fresher texture and appearance after a storage period.

14 Claims, No Drawings

BREAD CONTAINING WXSU$_2$ GENOTYPE STARCH AS AN ANTI-STALENT

BACKGROUND OF THE INVENTION

Due to the ability of consumers to critically discern small variations in bread characteristics such as crumb texture, crust tenderness, grain structure, loaf volume, and density, tremendous work has been done by the baking industry to provide breads which are both physically as well as organoleptically pleasing.

As used herein, the term "bread" is intended to apply generically to bakery products.

Staling is a principal concern in the industry due to the fact that it may limit the shelf life of bread to only about three or four days in the store plus a few additional days at home. Staling is defined as meaning all of the changes which occur in bread during storage which make it less palatable, except those due to the action of spoilage organisms. As bread stales, the crumb (interior of the loaf) becomes increasingly tough and hard. Eventually the crumb becomes dry and crumbly. These texture changes are accompanied by a decrease in the water absorption capacity of the crumb. It is well believed that starch retrogradation or crystallization plays an important, though not exclusive, role in staling.

Various preservatives and humectants commonly employed in breads to improve shelf life include such compounds as: lecithin, emulsifier/stabilizers such as mono- and diglycerides and certain esters thereof, stearyl tartrate, sodium or calcium stearoyl-2-lactylate, and sodium lactate. Much effort continues to develop natural means for retaining freshness and providing resistance to staling to both chemically and yeast leavened bakery products.

An object of the present invention is to provide a bakery product which has improved shelf life and resistance to staling.

A further objective is to provide a process for naturally improving the shelf life and resistance to staling of a bakery product.

SUMMARY

This invention is directed to chemically and yeast leavened bakery products with improved shelf-life provided by the addition of a starch or flour having the genetic composition wxsu$_2$, preferably derived from maize, to the dough formulation. The aforementioned starch, when added at about a 3 to 15%, preferably 5-10%, and most preferably 7-9%, substitution level based on the total farinaceous content of the dough results in a bakery product with a softer, moister crumb after baking as well as fresher texture and appearance after a storage period.

In addition to bread, other typical bakery products which would benefit from the addition of wxsu$_2$ starch include such items as fresh, refrigerated and frozen yeast-raised buns and rolls, yeast-raised sweet doughs, and chemically leavened baked products such as muffins, quick breads, cakes and biscuits.

DESCRIPTION OF THE PREFERRED EMBODIMENTS

In a preferred embodiment the starch employed is extracted from maize grown from double-recessive mutants of the waxy sugary-2 genotype, designated for purposes herein as wxsu$_2$. The waxy gene is located at position 59 of Chromosome 9 of corn while the sugary-2 gene is located at position (57) of Chromosome 6. (See M. G. Nueffer, L. Jones, and M. Zuber, "The Mutants of Maize" (Crop Science Society of America, Madison, WI 1968), pp. 72 and 73.).

Also within the scope of this invention is the starch resulting from wxsu$_2$ mutants wherein the wx and/or su$_2$ genotypes have been moved to another portion of the plant genome by translocation, inversion, or any other methods of chromosome engineering. In addition, starch extracted from a plant grown from artificial mutations and variations of the above genetic composition which may be produced by known standard methods of mutation breeding is also applicable herein. Our designation of the mutant as the wxsu$_2$ genotype is intended to mean that the mutant will necessarily contain the wx and su2 genes, but is not limited thereto.

The waxy genotype imparts to the corn plant the ability to produce a starch which consists primarily or totally of amylopectin, and the phenotype, or physical expression, of the endosperm of the waxy genotype is opaque with a hard waxy texture. The phenotype of the endosperm of the sugary-2 genotype, on the other hand, is translucent and sometimes wrinkled. The results of an investigation by R. Creech into the effect of sugary-2 and waxy gene mutations, singly and in combination, on the maize endosperm and the properties thereof are reported in *Advances in Agronomy*, Vol. 20 (Academic Press, 1968), pp. 275-322 and in *Genetics*, 52, pp. 1175-1186, December, 1965. An article by R. M. Sandstedt, B. D. Hites, and H. Schroeder, entitled "The Effects Of Genetic Variations In Maize On The Properties Of The Starches", published as paper no. 1894, Nebraska Agricultural Experiment Station, describes several properties of starches obtained from various genetic mutants of maize including wxsu2. The data in that report show the particular wxsu2 starch used to have a greater sol stability to heat as well as a lower gelatinization temperature than the wx starch. Starches obtained from mutant maize are also described by H. H. Kramer et al. in an article entitled "Gene Interactions In Maize Affecting Endosperm Properties" which appeared in *Agron. J.*, 50, pp. 207-210 (1958).

To obtain the double-recessive mutant of the wxsu2 genotype in maize in a usual manner, one may, for example, cross a waxy mutant (wx) with a sugary-2 mutant (su2), and thereafter self pollinate the first generation single cross (Wx wx Su2 su2) to theoretically recover the double mutant in a 15:1 ratio from a segregating ear. The starch utilized in this invention may be obtained from inbred lines, but it is more desirable that the starch be obtained from hybrids derived from inbreds containing the wxsu2 double-recessive mutant, ordinarily because of higher yields and other factors. While maize is the preferred specific plant herein for the source of the waxy starch, the invention is also applicable to other plant species such as, for example, waxy rice, waxy barley and waxy sorghum, provided that they are of wxsu2 genotype.

Extraction of the starch and flour from the kernel of the maize grown from the double-recessive mutant seed may be carried out in a standard manner by the wet-milling or dry-milling process well known in the art, but is not limited to such methods.

It is to be understood that the invention herein is meant to include not only bakery compositions containing wxsu$_2$ starch or flour but also those compositions containing any ground products from the plant such as, for example, grits, hominy, and meal.

While the use of natural unconverted and unmodified wxsu$_2$ starch is preferred for the intended use herein, it is to be understood that starch which has been lightly converted or modified by typical processes known in the art (i.e., etherification, esterification, and crosslinking) may be employed in the bakery composition provided the modification does not deleteriously effect the bakery product. Dextrinized wxsu$_2$ starch however, is not recommended for use herein. It has been found that the dextrinized flour provides breads with a low volume and firmer texture as well as an undesirable off-taste. Pregelatinized wxsu$_2$ starch was also found to not provide any shelf stability benefits to bakery compositions.

The amount of substitution of wxsu$_2$ starch employed in the bakery dough composition is normally in the range of 3-15%, based on the total farinaceous content of the dough, and preferably 5-10%. In order to determine the most effective amount of wxsu$_2$ starch necessary to provide a bakery product with improved shelf stability many factors must be taken into consideration by the practitioner. Included among these factors is the dough formulation, the moisture content of the dough as well as the farinaceous composition.

As the amount of wxsu$_2$ substitution is increased in a given dough formulation, the bakery product will become gummy resulting in a product with a decreased volume. Also, bakery products containing wxsu$_2$ starch obtained from corn, when used in larger amounts result in products having a corn taste. This may be an advantage to some systems such as corn or variety breads but a disadvantage in others such as white breads.

Other ingredients known to the skilled practitioner which are used to aid in production and/or to improve various quality factors of bakery products may be employed in addition to the wxsu$_2$ starch herein. Such ingredients would include, for example, crumb softeners including distilled and hydrated monoglycerides, dough conditioners, dough strengtheners, and emulsifiers. Knowledge of these various ingredients and their interactions within a given dough formulation may determine the benefits, if any, of their incorporation in a specific dough system with wxsu$_2$ starch.

In order to evaluate the breads described herein, two loaves were prepared from each dough formulation. One loaf was evaluated shortly after baking while the other loaf was stored in a plastic bag for 3 to 4 days before evaluation. A 35 mm thick slice was cut from the center of each loaf and evaluated employing a Stevens-LFRA Texture Analyzer run at a constant speed of 1mm/sec. The force (in grams) required to penetrate the bread a distance of 15 mm was then measured. A flat horizontal probe (#11) which measured 1½ by 13/16 inches was used to evaluate the bread samples shortly after baking. The aged bread samples which became firmer upon storage were usually evaluated with a second probe (#4), a 60° angle cone having a 1½ inch diameter base. Due to the difference in shape between the two test probes, only comparisons between similarly tested samples may be made. Furthermore, due to variable baking conditions, only samples prepared in the same manner and baked at the same time were directly compared with one another.

The following examples will more fully illustrate the practice of this invention but they are not intended to limit its scope. In the examples, the wxsu$_2$ starch and flour employed are obtained from maize. All parts and percentages are given by weight and all temperatures are in degrees Fahrenheit.

EXAMPLE 1

This example illustrates the effect of the addition of wxsu$_2$ starch or flour in a yeast leavened bread composition.

The following bread formulation and procedure were employed:

| BREAD FORMULATION | |
| --- | --- |
| Ingredients | Grams |
| All Purpose Wheat Flour | 380 |
| Water | 230 |
| Sugar | 18.85 |
| Shortening (plastic consistency) | 10.0 |
| Salt | 9.35 |
| Active Dry Yeast | 7 |

The yeast was dissolved in warm (115° F.) water and allowed to stand for one minute. Thereafter the shortening and the blended remaining ingredients were added to the yeast mixture. The mixture was mixed for two minutes on speed #1 of a Hobart Mixer then for an additional two minutes on speed #2. The dough was kneaded for four minutes then placed in a greased bowl, covered with a damp cloth and allowed to raise in a controlled humidity cabinet (80% humidity and 85° F.) for 1.25 hours. The dough was thereafter punched down, divided in half and placed in two small aluminum pans. The dough was allowed to raise an additional hour as before. The loaves were then baked for 20 minutes at 425° F. after buttering the tops. One loaf was allowed to cool before evaluating while the other was placed in a plastic bag after cooling for 2 hours.

Breads were prepared which contained 9.2% substitution levels based on the total flour concentration of corn or waxy maize flour and compared with breads containing wxsu$_2$ starch or flour. The loaves were evaluated as described above. Results may be found in Table I.

TABLE I

| | | Texture | | |
| --- | --- | --- | --- | --- |
| | | 2.5 Hours | 2 Days | |
| Sample | Flour Substitution | Probe #11 (g) | Probe #11 (g) | Comments |
| A | Control - no Additive | 844 | 1000+ | firm |
| B | 9.2% corn flour | 958 | 1000+ | firm |
| C | 9.2% waxy maize flour | 870 | 1000+ | very firm |
| D | 9.2% wxsu$_2$ flour | 678 | 1000+ | soft |
| E | 9.2% wxsu$_2$ starch | 308 | 600 | softest |

The results indicate that by employing either corn or waxy maize flour in the bread composition, the immediate texture and shelf stability of the bread was not improved. The use of wxsu$_2$ starch or flour, however, produced products which were initially softer as well as softer after storage than the control giving a preferred fresher appearance.

EXAMPLE 2

Breads were prepared as in Example 1 in order to compare formulations which contained wxsu$_2$ starch or flour with breads which contained pregelatinized wxsu$_2$ starch. The total flour concentration was 382 grams instead of 380 grams. The results may be found in Table II.

TABLE II

| Sample | Flour Substitution* | Texture 2 Hours Probe #11 (g) | 3 Days Probe #4 (g) |
|---|---|---|---|
| F | Control - no Additive | 958 | 410 |
| G | 8.1% wxsu$_2$ flour | 792 | 298 |
| H | 8.1% wxsu$_2$ starch | 618 | 220 |
| I | 8.1% pregelatinized wxsu$_2$ starch | 704 | 420 |

*Samples G through I also contained 8 grams vital gluten.

The results again showed that breads prepared with wxsu$_2$ starch and flour provided products with improved shelf-life. The use of pregelatinized wxsu$_2$ starch was seen to provide no benefit in shelf-life over the control.

EXAMPLE 3

Breads were prepared in order to compare formulations employing waxy maize or wxsu$_2$ starch with a control bread formulation.

Breads were prepared as in Example 1 except the total flour concentration was 382 grams instead of 380 grams. The control bread formulation was substituted with 8.1% wheat starch so that all the samples contained a similar reduced gluten content. Waxy maize starch with a reduced moisture content (7%) was employed because a similar dough prepared with waxy maize starch having a normal moisture content (11–13%) was too sticky and unmanageable to shape into loaves. The results may be found in Table III.

TABLE III

| Sample | Flour Substitution | Texture 3 Hours Probe #11 (g) | 2 Days Probe #4 (g)* |
|---|---|---|---|
| J | Control - 8.1% wheat starch | 610 | 440 |
| K | 8.1% waxy maize starch | 500 | 618 |
| L | 8.1% wxsu$_2$ starch | 385 | 358 |

*Bread penetration distance was 21 mm instead of 15 mm.

The results show that wxsu$_2$ starch provided bread with a softer crumb initially as well as after storage as compared with a control bread which had a similar reduced gluten content. Waxy maize starch provided bread with a firmer texture than the control after storage. The loaves were also compared by a test panel after 2 days of storage. Sample L containing wxsu$_2$ starch was rated overall the freshest in both appearance as well as texture.

EXAMPLE 4

This example illustrates the effect of wxsu$_2$ starch or flour in a bread composition which also contains a crumb softener.

Breads were prepared as in Example 1 except the total flour concentration was 382 grams instead of 380 grams. A total of 2.72 grams of Panatex, hydrated monoglycerides which are useful as crumb softeners obtained from Paniplus, was added to the bread formulations. After four days of storage, the loaves were sensory evaluated by a panel of four. The staleness of the loaves was rated on a scale of 1 to 10 with 1 being not stale and 10 being extremely stale. Results may be found in Table IV.

TABLE IV

| Sample | Flour Substitution | Crumb Softener | Texture 3 Hours Probe #11 (g) | 4 Days Probe #4 (g) | Rating |
|---|---|---|---|---|---|
| M | Control - no Additive | NO | 680 | 390 | — |
| N | Control - no Additive | YES | 748 | 400 | 7.5 |
| O | 8.1% wxsu$_2$ flour | YES | 660 | 283 | 5.25 |
| P | 8.1% wxsu$_2$ starch | YES | 302 | 203 | 1.75 |

The results indicate that wxsu$_2$ starch or flour may be used in conjunction with crumb softeners to produce breads with improved shelf-life.

EXAMPLE 5

This example illustrates the use of wxsu$_2$ flour in a chemically leavened corn muffin composition.

The following muffin formulations and procedure were employed:

CORN MUFFIN FORMULATION

| Ingredients | Sample Q (Control) (g) | Sample R (g) |
|---|---|---|
| All Purpose Wheat Flour | 135 | 135 |
| Corn Meal | 163 | 149.96 |
| wxsu$_2$ Flour | 0 | 13.04 (1) |
| Milk | 227 | 227 |
| Egg | 43 | 43 |
| Vegetable Oil | 43 | 43 |
| Sugar | 28 | 28 |
| Baking Powder | 12.5 | 12.5 |
| Salt | 1.8 | 1.8 |

(1) 4.36% substitution based on the total farinaceous concentration.

The dry ingredients were blended then added to the liquid ingredients and mixed on Speed #4 of a Hobart Mixer for one minute. The muffins were then baked at 425° F. for 21 minutes.

After baking, the muffins were stored in plastic bags for two days and then sensory evaluated by a test panel of six. The muffins were viewed under yellow light in order to mask any slight difference in color between the two muffin types. All panelists chose the muffins containing the wxsu$_2$ flour as having a fresher appearance. These muffins were also rated as having a fresher mouthfeel and texture over that of the control.

EXAMPLE 6

This example illustrates the use of wxsu$_2$ starch in a chemically leavened muffin composition.

The following muffin formulation and procedure were employed:

MUFFIN FORMULATION

| Ingredients | Sample S (Control) (g) | Sample T (g) |
|---|---|---|
| All Purpose Wheat Flour | 270 | 248.4 |
| wxsu$_2$ Starch | 0 | 21.6 (1) |
| Milk | 227 | 227 |
| Sugar | 45 | 45 |
| Egg | 43 | 43 |
| Vegetable Oil | 43 | 43 |
| Baking Powder | 9.7 | 9.7 |
| Salt | 3.6 | 3.6 |

(1) 8% substitution based on the total flour concentration.

The dry ingredients were blended then added to the liquid ingredients and mixed for two minutes in a bowl with a spatula. The muffins were baked at 400° F. for 21 minutes. After baking the muffins were stored for 2 days then sensory evaluated by a panel of seven. Six of the seven people found the muffins prepared with wxsu$_2$ starch to be fresher in appearance and texture.

We claim:

1. In a farinaceous-based bakery product prepared from a dough comprising a farinaceous material, an edible liquid, and a leavener, the improvement which comprises the presence in the dough of an effective amount of a waxy starch from a plant of a wxsu$_2$ genotype and translocations, inversions, mutants, and variants thereof containing the wxsu$_2$ genotype, the amount being effective to improve shelf-life and softness retention of the baked dough.

2. The dough of claim 1, wherein the plant is corn.

3. The dough of claim 2, wherein the waxy starch is wxsu$_2$ flour.

4. The dough of claim 2, wherein the waxy starch is present in an amount of about 3 to 15% based on the total farinaceous content of the dough.

5. The dough of claim 4, wherein the waxy starch is present in an amount of about 5 to 10%.

6. The dough of claim 1, wherein the leavener is yeast.

7. The dough of claim 1, wherein the leavener is baking powder.

8. The dough of claim 1, further comprising a crumb softener selected from the group consisting of distilled and hydrated monoglycerides.

9. The dough of claim 1, wherein the bakery product is selected from the group consisting of bread, buns, rolls, sweet doughs, muffins, quick breads, cakes and biscuits.

10. A process for improving the shelf life of a leavened farinaceous-based bakery product, which comprises the step of replacing a portion of the farinaceous content of the bakery product dough with a waxy starch from a plant of a wxsu$_2$ genotype and translocations, inversions, mutants, and variants thereof containing the wxsu$_2$ genotype, prior to baking the dough, the replacement amount being sufficient to improve softness retention of the bakery product over an extended shelf life period.

11. The process of claim 10 wherein the plant is corn.

12. The process of claim 10 wherein the waxy starch is wxsu$_2$ flour.

13. The process of claim 10 wherein the waxy starch is added in an amount of about 3 to 15% based on the total farinaceous content of the dough.

14. The process of claim 10, wherein the bakery product is selected from the group consisting of bread, buns, rolls, sweet doughs, muffins, quick breads, cakes and biscuits.

* * * * *